United States Patent [19]
Cremona

[11] 3,750,725
[45] Aug. 7, 1973

[54] VENEER SLICER MACHINE
[76] Inventor: Angelo Cremona, Viale Lombardia 275, 20052 Monza, Italy
[22] Filed: Nov. 24, 1971
[21] Appl. No.: 201,846

Related U.S. Application Data
[63] Continuation-in-part of Ser. No. 106,646, Jan. 15, 1971, abandoned.

[52] U.S. Cl. ................... 144/178, 83/643, 83/644
[51] Int. Cl. .............................................. B27c 1/00
[58] Field of Search ......................... 144/177, 178; 83/647 S, 646, 643, 644

[56] References Cited
UNITED STATES PATENTS
1,986,685   1/1935   Soderberg ......................... 83/644
2,482,685   9/1949   Moyer ............................... 83/643 X
590,472     9/1897   Bessey .............................. 83/643 X Primary Examiner—Andrew R. Juhasz
Assistant Examiner—W. Donald Bray
Attorney—John J. McGlew et al.

[57] ABSTRACT

A veneer slicing machine or wood shearing machine includes a supporting table for receiving the wood stock to be cut which is indexed upwardly at a predetermined rate in dependence upon the wood sheets or veneer which is to be formed. The block is cut by a movable knife blade assembly which is mounted at each end on slide members which move backwardly and forwardly on defined trackways on each side of a machine frame. A smaller stroke and less stress operation of the machine is obtained by driving the knife assembly through a drive motor connected to separate rotatable fly wheels. The fly wheels are connected through respective connecting rods which are articulated to their periphery and to the blade assembly at their respective opposite ends at locations adjacent each end of the assembly. A third connecting rod is pivoted at its one end to the frame of the machine and pivoted at its opposite end to the blade assembly adjacent one of the pivot rod connections. It's end which is connected to the blade assembly moves through an arc, and the combined motion is such that the blade approaches the wood stock when it is angled transversely by an angle of 5° and this angle will vary, until it reaches the end of the shearing operation, to a value of about 20°. In an alternate arrangement the table, or bed carrying the wood stock, is connected to the fly wheels for movement backwardly and forwardly along with the shearing knife to provide a divided stroke system which will have smaller dynamic stresses than the fixed system.

5 Claims, 5 Drawing Figures 3,750,725

VENEER SLICER MACHINE

REFERENCE TO OTHER PATENT APPLICATION

This application is a continuation-in-part of application Ser. No. 106,646 filed Jan. 15, 1971, by the same inventor as the present case and now abandoned.

BACKGROUND OF THE INVENTION

1. Field of the Invention

This invention relates in general to devices for cutting thin strips from a wood log or stock of wood and in particular to a new and useful veneer slicer having a shearing blade assembly which is mounted for sliding movement backwardly and forwardly over the wood stock as the stock is advanced toward the shear in incremental steps and which is driven in a manner to change its transverse angle of approach to the wood stock during the shearing operation.

2. Description of the Prior Art

At the present time veneer slicer machines are known which include a shearing knife which is movable over a wood workpiece in order to effect thin shearing cuts of the wood to form veneer. Such devices include knife blade assemblies which are carried on slides which move on trackways at each end of the blade and the assembly may be moved so that the knife blade is at an angle in respect to the wood block which is being cut. Such oblique cutting is carried out in order to lower the shearing stresses during the operation. This is obtained by either orienting the blade at an angle to the machine axis or by angling the wood stock relative to the blade. In both methods the shearing stroke is relatively large and this is a function of the angle which is established between the blade and the wood stock.

SUMMARY OF THE INVENTION

In accordance with the invention a wood shearing apparatus includes a movable blade assembly which is driven by means to control the shearing angle in respect to the wood stock in a manner to lower the stress operation of the machine and to permit the movement of the blade through smaller strokes. The drive includes laterally spaced rotating fly wheels which are connected to the moving blade through separate connecting rods which have their one ends pivoted to the periphery of the fly wheels and the opposite ends pivoted to respective ends of the movable knife. The knife assembly is further controlled by means of a connecting rod which is pivoted at one end to a fixed location of the frame between the fly wheels and pivoted at its opposite end to the movable knife assembly at a closely spaced location in respect to one of the connecting rods. The individual connecting rods which are secured to the fly wheels are arranged in parallel relationship and are of the same length and they move in the form of a parallelogram during the motion of the knife blade assembly.

In accordance with another embodiment of the invention the table or bed which carries the wood stock is connected to the fly wheels through connecting rods arranged at each end and in a parallel relationship to each other so that there is a combined movement of the wood and the blade so that still further reductions in shearing stress and length of stroke may be accomplished.

Accordingly it is an object of the invention to provide an improved device for cutting wood veneer which includes a drive for a movable knife blade with a controlled movement of the blade past a wood supply or stock to cut the stock into veneer strips and which includes means for orienting the blade so that the approach in respect to the wood stock is controlled during the cutting movement to provide an optimum shearing action, lower cutting stroke length and a reduction of shearing stresses.

A further object of the invention is to provide a drive mechanism for operating a shearing knife assembly in respect to a wood stock supported adjacent the assembly and advanced in relation to the assembly in accordance with the thickness to be cut during each working stroke, and which includes laterally spaced rotating fly wheels which are connected through substantially parallely arranged connecting rods to respective ends of the knife blade assembly, and which is also connected by means of a connecting rod which is articulated at a fixed point and to one end of the assembly adjacent the connection of one of the connecting rods.

A further object of the invention is to provide a veneer slicer in which the shearing blade is moved through a varying angle in respect to the wood stock to be cut, and in which the wood stock is held either in a fixed location and advanced in increments toward the blades during each successive stroke or is held on a movable bed which is also driven backwardly and forwardly along with the shearing knife.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated preferred embodiments of the invention.

GENERAL DESCRIPTION OF THE PREFERRED EMBODIMENTS

Figure 1:
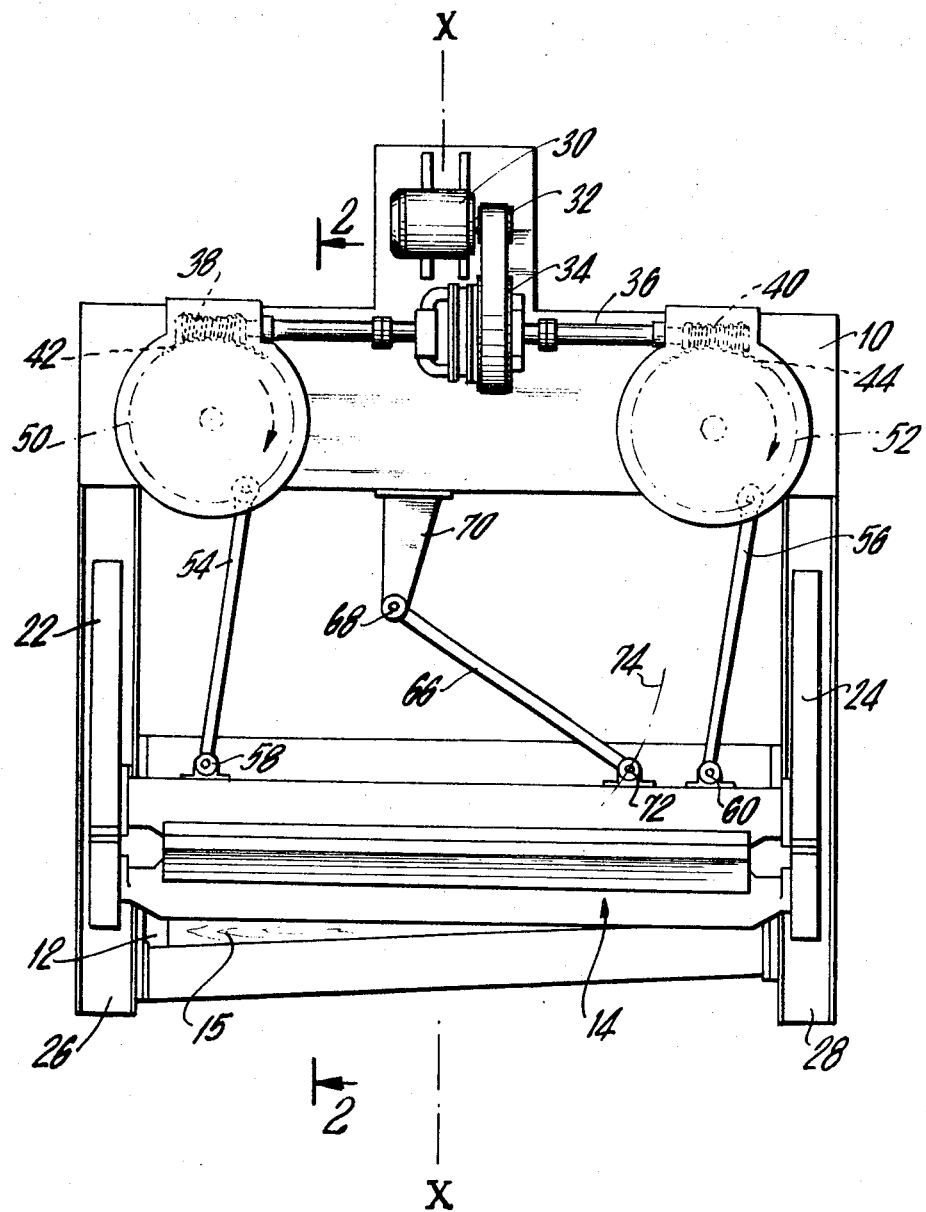
FIG. 1 is a schematic top plan view of a veneer slicer constructed in accordance with the invention.
Figure 2:
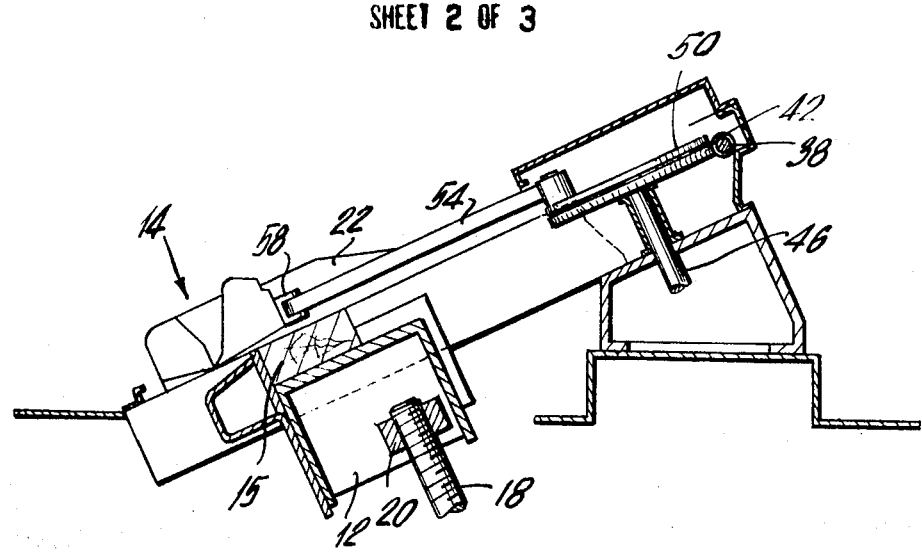
FIG. 2 is a section taken along the line 2—2 of FIG. 1.

Referring to the drawings in particular the invention embodied therein in FIGS. 1 and 2 comprises a veneer slicer which includes a machine base or frame 10 having a bed or table 12 carrying a wood stock for a workpiece 15 which is advanced with the table 12 after each successive shearing or cutting stroke of a cutting blade or knife assembly generally designated 14. The advancing of the table 12 is, for example, carried out by the rotation of a threaded spindle 18 which engages with a nut 20 affixed to the table 12 after each operation stroke by an amount which is set by the selection of the veneer thickness to be formed. The wood stock carried on the table is indexed to the value of the desired sheet thickness with every knife stroke and the table may, for example, be supported by a plurality of the threaded spindles 18 which is connected to a selection device, (not shown), which controls the indexing of the table and hence the thickness of the veneer which is cut.

In accordance with the invention the knife blade assembly 14 is supported at each end on respective slide members 22 and 24 which ride in trackways 26 and 28 defined at each side of the machine frame 10. The knife assembly 14 and the slides 22 and 24 connected thereto slide on the trackways 26 and 28 of the machine frame 10 during the feeding phase or cutting phase while during its reversal phase the wood stock 15 is lifted by the table in accordance with the thickness of the next sheet to be cut. The movable knife assembly 14 is driven by drive means which includes a drive motor 30 which is connected, for example, through a pulley 32 to a variable speed coupling 34 on a split drive shaft 36. The split drive shaft carries worms 38 and 40 at respective ends which engage with and rotate gears 42 and 44 respectively which are secured by respective shafts 46 and 46' which carry fly wheels 50 and 52 respectively.

In accordance with a feature of the invention the fly wheels 50 and 52 are connected through parallelly arranged connecting rods 54 and 56 respectively to the knife assembly 14. The connecting rods 54 and 56 are pivoted at 58 and 60 to respective ends of the knife blade assembly 14. In addition, a third connecting rod 66 is pivoted at its one end on a pivot 68 carried on a fixed bracket 70 and pivoted at its opposite end to a pivot 72 which is spaced closely to the pivot 60 on the cutting blade assembly 14. The pivot point 72 moves through an arcuate path 74 as shown in FIG. 1.

During operation the blade assembly 14 is forced to advance with the blade edge normal to the longitudinal axis X—X of the machine but laterally angled or obliquely in respect to the wood stock 15. In order to favor this movement an enlargement of the trackways 26 and 28 to accommodate the slides 22 and 24 is provided. The connecting rod 66 may act as a strut as well as a tie rod. It should be appreciated that the wood stock 15, as shown in the drawings, is arranged obliquely but this inclination is in fact very small and is shown exaggerated in the drawings. In practice it is necessary to impart only a few degrees of lateral inclination to the wood stock so as to avoid the attacking of a wood stock by the blade throughout its length simultaneously.

The connecting rods 54 and 56 are of the same length and they form part of an articulated parallelogram which moves as a function of the pivotal connection of the associated connecting rods to the fly wheels 42 and 44 as the fly wheels are rotated. The location of the pivot 68 and 72 for the connecting rod 66 determine the path of the curve of the blade holder assembly 14 and the position of the arcuate path 74 and the construction is such that during a complete stroke movement of the knife blade assembly 14 from the rear dead center to the front dead center, the position of the blade will be displaced in respect to its angle to the center line X—X of the machine so that it becomes inclined in respect to the wood stock by an initial amount of 5° which varies up to about a value of 20° before the end of the shearing operation.

Figure 4:
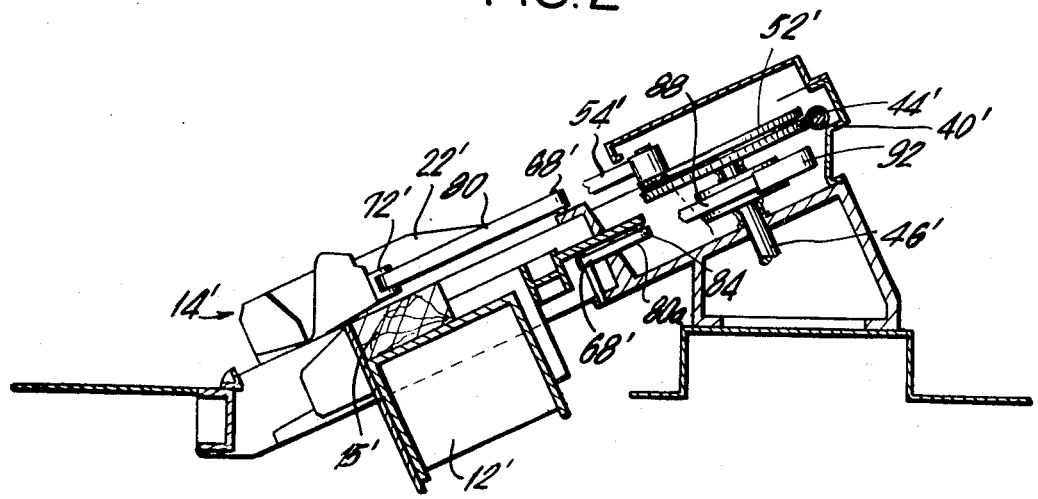
FIG. 4 is a section taken along the line 4—4 of FIG. 3.
Figure 5:
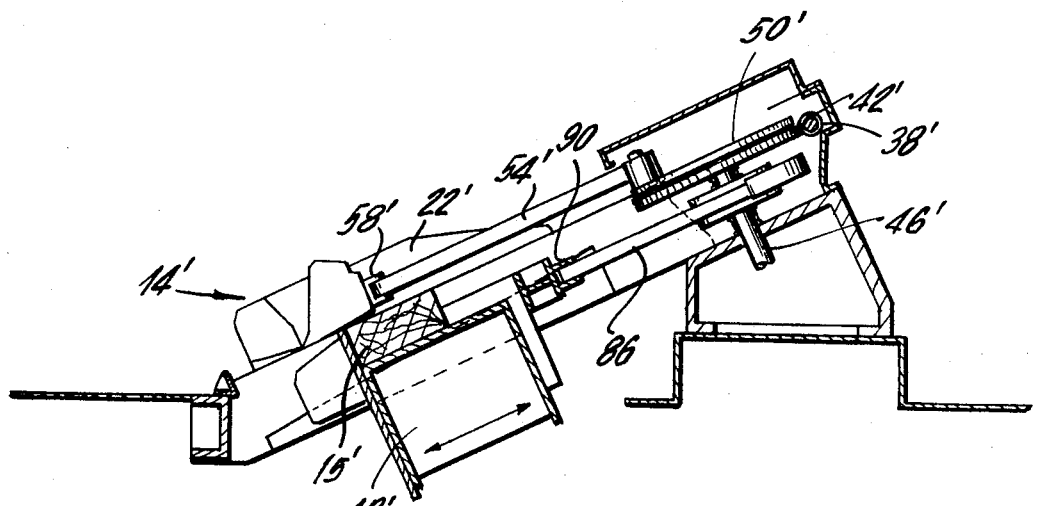
FIG. 5 is a section taken along the line 5—5 of FIG. 3.
Figure 3:
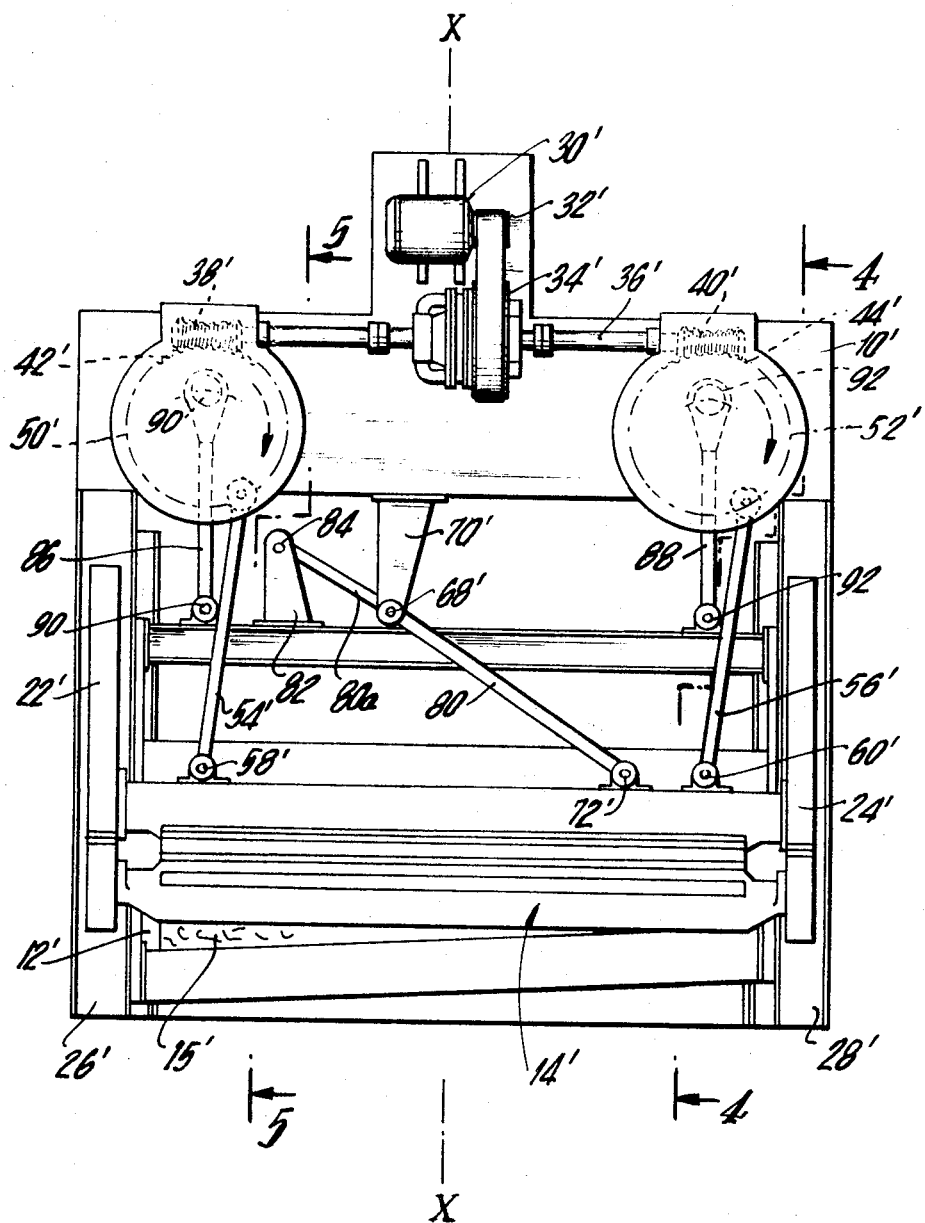
FIG. 3 is a view similar to FIG. 1 of another embodiment of the invention.

A preferred embodiment of the device is shown in FIG. 3 to 5, wherein similar parts are similarly designated but with primes added. The construction shown in FIGS. 3 to 5 provides a drive means for moving the bed 12' for the wood stock 15' during the cutting operation so that the stroke of movement of the combined movement of the blade assembly 14' and the bed 12' will be of a lesser magnitude. This construction also reduces the stresses at the dead center locations and provides a movement of the bed 12' and the blade holder assembly 14' in substantially a straight line but with the blade shifted angularly in respect to the wood stock 15'. The drive connections for the blade assembly 14' are similar to that of the other embodiment but in this embodiment an additional connecting rod 80 is pivoted at 72' to the blade assembly 14' and at 68' to a bracket 70' but it includes an extension portion 80a which is pivoted on a bracket 82 at a pivot location 84.

The drive means also includes a connecting rod 86 and 88 which is eccentrically connected at 90 and 92 respectively to the fly wheels 50' and 52' respectively, and at their opposite ends are connected to the bed 12' at 90 and 92 respectively.

While specific embodiments of the invention have been shown and described in detail to illustrate the application of the principles of the invention, it will be understood that the invention may be embodied otherwise without departing from such principles.

What is claimed is:

1. A device for cutting wood stock into thin sheets, particularly for slicing wood veneer, comprising a machine frame, a cutting blade assembly guided for back and forth movement on said frame, bed holding means for holding the wood stock adjacent said cutting blade assembly in a position to be cut thereby, and a drive for said cutting blade assembly to move it into cutting engagement with the wood stock at an angle in respect to the wood stock which varies during the cutting and, including first and second spaced fly wheels rotatably mounted on said machine frame, means to rotate said first and second fly wheels, first and second parallelly arranged connecting rods pivoted at their one end to said fly wheels eccentrically in respect to the axis thereof, and at their opposite ends to respective spaced longitudinal locations on said cutting blade assembly, and a third connecting rod having one end pivotally connected to said machine frame and an opposite end pivotally connected to said cutting blade assembly at a location closer to one of said connecting rods and to the other of said first and second connecting rods, said drive including means for moving said bed holding means for the wood stock backwardly and forwardly along with said cutting blade.

2. A device according to claim 1, wherein said first and second fly wheels includes a shaft having a gear thereon, a rotatable drive shaft having a worm at respective opposite ends connected to the gears of said fly wheel shaft for rotating said fly wheels.

3. A device according to claim 1, wherein said first and second connecting rods are of equal length.

4. A device according to claim 1, including means for advancing said bed holding means to index the wood stock into the cutting plane by an amount corresponding to the thickness to be cutoff from the wood stock.

5. A device according to claim 1, wherein said means for moving said bed holding means comprises first and second bed connecting rods having their one ends eccentrically connected to said fly wheels and the opposite ends pivotally connected to said bed holding means at longitudinally spaced locations.

\* \* \* \* \*